US012579929B2

(12) United States Patent
Kang et al.

(10) Patent No.: US 12,579,929 B2
(45) Date of Patent: Mar. 17, 2026

(54) PIXEL, METHOD OF DRIVING THE SAME, AND ELECTRONIC DEVICE

(71) Applicant: Samsung Display Co., Ltd., Yongin-Si (KR)

(72) Inventors: Sang Hyun Kang, Yongin-si (KR); Oh Chul Kwon, Yongin-si (KR); Byung Kwan Song, Yongin-si (KR); Joo Sun Yoon, Yongin-si (KR); Sang Myoung Lee, Yongin-si (KR); Jae Hoon Lee, Yongin-si (KR); Joon Huh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/961,448

(22) Filed: Nov. 27, 2024

(65) Prior Publication Data

US 2025/0265970 A1 Aug. 21, 2025

(30) Foreign Application Priority Data

Feb. 21, 2024 (KR) ........................ 10-2024-0025133

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2320/041* (2013.01)

(58) Field of Classification Search
CPC ... G09G 3/32; G09G 3/3233; G09G 2320/041
See application file for complete search history.

(56) References Cited

U.S. PATENT DOCUMENTS

| | | | | |
|---|---|---|---|---|
| 9,760,213 | B2 | 9/2017 | Kim et al. | |
| 9,886,908 | B2 | 2/2018 | Tani et al. | |
| 2023/0032883 | A1 | 2/2023 | Park et al. | |
| 2023/0360590 | A1 * | 11/2023 | Jeong | G09G 3/3233 |
| 2024/0021156 | A1 | 1/2024 | Lee | |
| 2024/0347007 | A1 | 10/2024 | Byun et al. | |

FOREIGN PATENT DOCUMENTS

| | | | |
|---|---|---|---|
| KR | 10-2017-0003841 | A | 1/2017 |
| KR | 10-2448658 | B1 | 10/2022 |
| KR | 10-2024-0153513 | A | 10/2024 |

* cited by examiner

*Primary Examiner* — Stacy Khoo
(74) *Attorney, Agent, or Firm* — Innovation Counsel LLP

(57) ABSTRACT

A pixel includes a light emitting element emitting light based on a driving current, an emission transistor passing and blocking the driving current when receiving an emission signal of a turn-on and turn-off level, and an initialization transistor supplying and not supplying an initialization voltage to the light emitting element when receiving an initialization signal of a turn-on and a turn-off level. The emission signal sequentially includes first and second pulses of a turn-on level, and the initialization signal sequentially includes third and fourth pulses of a turn-on level. The third pulse is generated in a period between the first pulse and the second pulse, the fourth pulse is generated after the second pulse. When an end time point of the first pulse changes, a start time point of the third pulse changes.

21 Claims, 19 Drawing Sheets

<ADDRESS SCAN>

<SELF SCAN>

<AUXILIARY SCAN>

PIXEL, METHOD OF DRIVING THE SAME, AND ELECTRONIC DEVICE

This application claims priority to Korean Patent Application No. 10-2024-0025133, filed on Feb. 21, 2024, and all the benefits accruing therefrom under 35 U.S.C. § 119, the content of which in its entirety is herein incorporated by reference.

BACKGROUND

1. Field

The disclosure relates to a pixel, a method of driving the same, an electronic device.

2. Description of the Related Art

As information technology develops, importance of a display device, which is a connection medium between a user and information, has been highlighted. In response to this, a use of a display device such as a liquid crystal display device and an organic light emitting display device is increasing.

The display device displays an image using a plurality of pixels. Each of the pixels may include a plurality of transistors. A characteristic of the plurality of transistors may change according to an ambient temperature or a temperature of a user's finger during a user's touch. In this case, a luminance of the displayed image may vary according to the temperature.

SUMMARY

A technical feature is to provide a pixel and a method of driving the same that may emit light with a targeted luminance even though a temperature changes.

According to an embodiment of the disclosure, a pixel includes a light emitting element emitting light with a luminance based on a driving current, an emission transistor passing the driving current when the emission transistor receives an emission signal of a turn-on level and blocking the driving current when the emission transistor receives the emission signal of a turn-off level, and an initialization transistor supplying an initialization voltage to an anode electrode of the light emitting element when the initialization transistor receives an initialization signal of a turn-on level and stopping the supplying of the initialization voltage when the initialization transistor receives the initialization signal of a turn-off level. The emission signal sequentially includes a first pulse and a second pulse of a turn-on level. The initialization signal sequentially includes a third pulse and a fourth pulse of a turn-on level, the third pulse is generated in a period between the first pulse and the second pulse, the fourth pulse is generated after the second pulse. When an end time point of the first pulse changes to a changed end time point, a start time point of the third pulse changes to a changed start time point.

When the end time point of the first pulse changes to the changed end time point, a width of the first pulse may change to a changed width.

When the end time point of the first pulse changes to the changed end time point, a start time point of the first pulse may not change.

When the end time point of the first pulse becomes earlier to the changed end time point, a start time point of the third pulse may become earlier to the changed start time point.

Regardless of the changed width of the first pulse, a time interval between the changed end time point of the first pulse and the changed start time point of the third pulse may be maintained.

As the changed width of the first pulse decreases, the time interval between the changed end time point of the first pulse and the changed start time point of the third pulse may decrease.

As the changed width of the first pulse decreases, the time interval between the changed end time point of the first pulse and the changed start time point of the third pulse may increase.

When the width of the first pulse changes, a width of the second pulse may be maintained.

When the width of the first pulse changes, a width of the third pulse and a width of the fourth pulse may be maintained.

While the first pulse is maintained, the initialization signal may maintain the turn-off level.

According to an embodiment of the disclosure, a method of driving a pixel, which includes a light emitting element emitting light with a luminance based on a driving current, an emission transistor passing the driving current when the emission transistor receives an emission signal of a turn-on level and blocking the driving current when the emission transistor receives the emission signal of a turn-off level, and an initialization transistor supplying an initialization voltage to an anode electrode of the light emitting element when the initialization transistor receives an initialization signal of a turn-on level and stopping the supplying of the initialization voltage when the initialization transistor receives the initialization signal of a turn-off level, includes supplying the emission signal sequentially including a first pulse and a second pulse of a turn-on level, and supplying the initialization signal sequentially including a third pulse and a fourth pulse of a turn-on level. The third pulse is generated in a period between the first pulse and the second pulse, and the fourth pulse is generated after the second pulse. When an end time point of the first pulse changes to a changed end time point, a start time point of the third pulse changes to a changed start time point.

When the end time point of the first pulse changes to the changed end time point, a width of the first pulse may change to a changed width.

When the end time point of the first pulse changes to the changed end time point, a start time point of the first pulse may not change.

When the end time point of the first pulse becomes earlier to the changed end time, a start time point of the third pulse may become earlier to the changed start time point.

Regardless of the changed width of the first pulse, a time interval between the changed end time point of the first pulse and the changed start time point of the third pulse may be maintained.

As the changed width of the first pulse decreases, the time interval between the changed end time point of the first pulse and the changed start time point of the third pulse may decrease.

As the changed width of the first pulse decreases, the time interval between the changed end time point of the first pulse and the changed start time point of the third pulse may increase.

When the width of the first pulse changes, a width of the second pulse may be maintained.

When the width of the first pulse changes, a width of the third pulse and a width of the fourth pulse may be maintained.

While the first pulse is maintained, the initialization signal may maintain the turn-off level.

According to an embodiment of the disclosure, an electronic device includes: a processor to provide input image data; and a display device to display an image based on the input image data by using pixels. Each of the pixels includes: a light emitting element emitting light with a luminance based on a driving current; an emission transistor passing the driving current when the emission transistor receives an emission signal of a turn-on level and blocking the driving current when the emission transistor receives the emission signal of a turn-off level; and an initialization transistor supplying an initialization voltage to an anode electrode of the light emitting element when the initialization transistor receives an initialization signal of a turn-on level and stopping the supplying of the initialization voltage when the initialization transistor receives the initialization signal of a turn-off level. The emission signal sequentially includes a first pulse and a second pulse of a turn-on level, the initialization signal sequentially includes a third pulse and a fourth pulse of a turn-on level, the third pulse is generated in a period between the first pulse and the second pulse, the fourth pulse is generated after the second pulse, and when an end time point of the first pulse changes to a changed end time point, a start time point of the third pulse changes to a changed start time point.

The pixel, the method of driving the same, and the electronic device may emit light with a targeted luminance even though a temperature changes.

BRIEF DESCRIPTION OF THE DRAWINGS

The above and other features of the disclosure will become more apparent by describing in further detail embodiments thereof with reference to the accompanying drawings.

DETAILED DESCRIPTION OF THE EMBODIMENT

Figure 1:
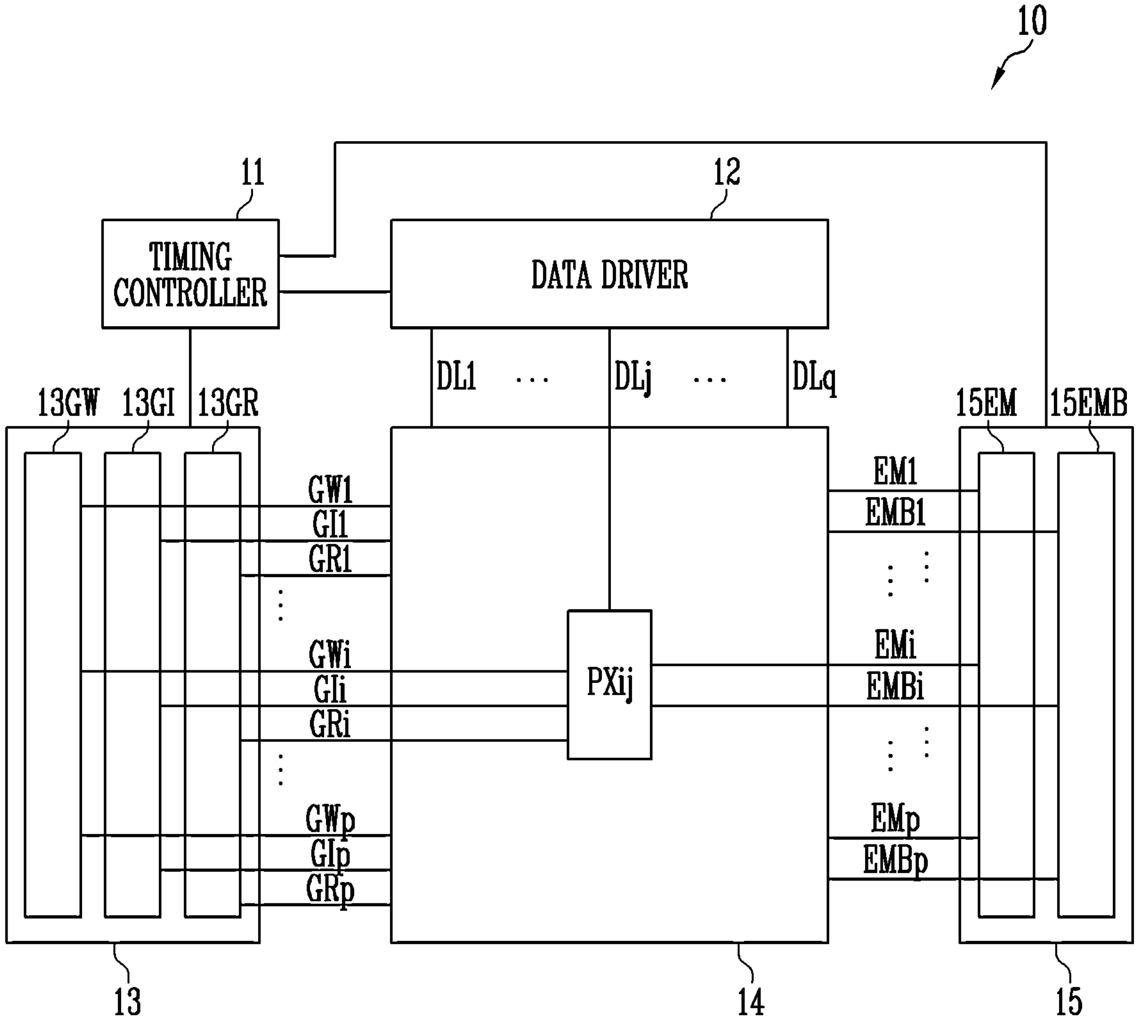
FIG. 1 is a diagram illustrating a display device according to an embodiment of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

FIG. 1 is a diagram illustrating a display device 10 according to an embodiment of the disclosure.

Referring to FIG. 1, the display device 10 according to an embodiment of the disclosure may include a timing controller 11, a data driver 12, a scan driver 13, a pixel unit 14, and an emission driver 15.

The timing controller 11 may receive grayscales for an input image (or an input frame). The grayscales may include a first color grayscale, a second color grayscale, and a third color grayscale. The first color grayscale may be a grayscale for expressing a first color, the second color grayscale may be a grayscale for expressing a second color, and the third color grayscale may be a grayscale for expressing a third color.

In addition, the timing controller 11 may receive a control signal for an image. Such a control signal may include a horizontal synchronization signal (Hsync), a vertical synchronization signal (Vsync), a data enable signal, maximum luminance information, and the like. The vertical synchronization signal may include a plurality of pulses, and may indicate that a previous frame period is ended and a current frame period is started based on a time point at which each of the pulses is generated. An interval between adjacent pulses of the vertical synchronization signal may correspond to one frame period. The horizontal synchronization signal may include a plurality of pulses, and may indicate that a previous horizontal period is ended and a new horizontal period is started based on a time point at which each of the pulses is generated. An interval between adjacent pulses of the horizontal synchronization signal may correspond to one horizontal period. The data enable signal may have an enable level with respect to specific horizontal periods and a disable level in remaining periods. When the data enable signal is at the enable level, the data enable signal may indicate that color grayscales are supplied in corresponding horizontal periods.

The maximum luminance information may be information on a maximum luminance of the display device 10. The maximum luminance may be luminance information of light emitted from pixels set to a maximum grayscale. For example, the maximum luminance may be a luminance of white light generated by all pixels of the pixel unit 14 emitting light to correspond to a white grayscale. A unit of a luminance may be nit. The maximum luminance may also be referred to as a display brightness value. This maximum luminance may be set manually by a user's manipulation of the display device 10, or may be set automatically by an algorithm linked to an illuminance sensor or the like. For example, a maximum value of the maximum luminance may be 1200 nits, and a minimum value may be 4 nits. The maximum and the minimum values of the maximum luminance may be set variously according to a product.

Even though a grayscale is the same, an emission luminance of the pixel may change according to the maximum luminance. For example, when the maximum luminance changes, a duty ratio of first emission signals may change. As another example, when the maximum luminance changes, different data voltages may be applied for the same grayscale. As still another example, a duty ratio change of the first emission signals and a data voltage change may be applied simultaneously.

The timing controller 11 may provide grayscales rendered or corrected to correspond to a specification of the display device 10 to the data driver 12. In addition, the timing controller 11 may provide a clock signal, a scan start signal, and the like to the scan driver 13. The timing controller 11 may provide a clock signal, an emission start signal, and the like to the emission driver 15.

The data driver 12 may generate data voltages to be provided to data lines DL1, . . . , DLj, . . . , and DLq using the grayscales and control signals received from the timing controller 11. For example, the data driver 12 may sample the grayscales using the clock signal and apply data voltages corresponding to the grayscales to data lines in a pixel row unit. q may be an integer greater than 1, and j may be an integer greater than 0 and less than q.

The scan driver 13 may include first to third scan drivers 13GW, 13GI, and 13GR. The first scan driver 13GW may provide first scan signals to first scan lines GW1, . . . , GWi, . . . , and GWp. p may be an integer greater than 1, and i may be an integer greater than 0 and less than p. The second scan driver 13GI may provide second scan signals to second scan lines GI1, . . . , Gli, . . . , and GIp. The third scan driver 13GR may provide third scan signals to third scan lines GR1, . . . , GRi, . . . , and GRp.

For example, the first scan driver 13GW may receive at least one scan clock signal and the scan start signal from the timing controller 11 and generate the first scan signals to be provided to the first scan lines GW1 to GWp. The first scan driver 13GW may sequentially provide first scan signals having a turn-on level pulse to the first scan lines GW1 to GWp. For example, the first scan driver 13GW may be configured in a form of a shift register, and may generate the first scan signals in a method of sequentially transmitting the scan start signal having a turn-on level pulse form to a next scan stage under control of the scan clock signal. Since the second scan driver 13GI and the third scan driver 13GR may be configured substantially identically to the first scan driver 13GW, an overlapping description is omitted.

The emission driver 15 may include a first emission driver 15EM and a second emission driver 15EMB. The first emission driver 15EM may provide first emission signals to first emission lines EM1, . . . , EMi, . . . , and EMp. The second emission driver 15EMB may provide second emission signals to second emission lines EMB1, . . . , EMBi, . . . , and EMBp.

For example, the first emission driver 15EM may receive at least one emission clock signal and the emission start signal from the timing controller 11 and generates the first emission signals to be provided to the first emission lines EM1 to EMp. The first emission driver 15EM may sequentially provide emission signals having a turn-on level pulse to the first emission lines EM1 to EMp. For example, the first emission driver 15EM may be configured in a form of a shift register, and may generate the first emission signal in a method of sequentially transmitting the emission start signal having a turn-on level pulse form under control of the emission clock signal. Since the second emission driver 15EMB may be configured substantially identically to the first emission driver 15EM, an overlapping description is omitted.

In FIG. 1, each of the number of the first scan lines GW1 to GWp, the second scan lines GI1 to GIp, the third scan lines GR1 to GRp, the first emission lines EM1 to EMp, and the second emission lines EMB1 to EMBp is shown as p. However, in an embodiment, the number of at least one of the second scan lines GI1 to GIp, the third scan lines GR1 to GRp, the first emission lines EM1 to EMp, and the second emission lines EMB1 to EMBp may be p/2 or less. For example, two adjacent pixel rows may share one second scan line. Similarly, two adjacent pixel rows may share one third scan line, first emission line, or second emission line. The same pixel row refers to pixels connected to the same first scan line.

The pixel unit 14 includes pixels. Each pixel PXij may be connected to the corresponding data line DLj, scan lines GWi, Gli, GRi, and emission lines Emi and EMBi. Each pixel PXij may include a light emitting element emitting light based on a received data voltage.

The pixel unit 14 may include first pixels emitting light of the first color, second pixels emitting light of the second color, and third pixels emitting light of the third color. The first color, the second color, and the third color may be different colors. For example, the first color may be one of red, green, and blue, the second color may be one other than the first color among red, green, and blue, and the third color may be one other than the first color and the second color among red, green, and blue. In addition, magenta, cyan, and yellow may be used instead of red, green, and blue as the first to third colors.

The pixel unit 14 may be disposed in various shapes such as diamond PENTILE™, RGB-Stripe, S-stripe, Real RGB, and normal PENTILE™.

Figure 2:
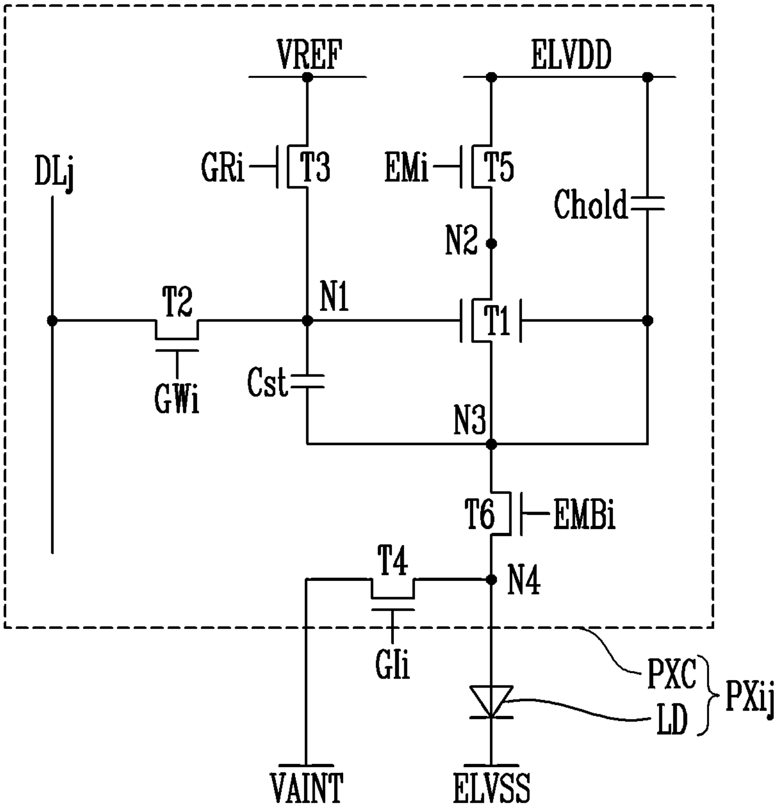
FIG. 2 is a diagram illustrating a pixel according to an embodiment of the disclosure.
Figure 3:
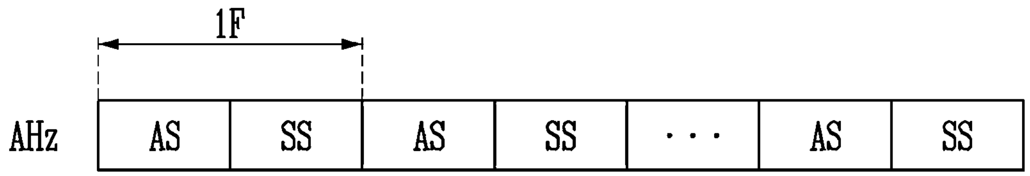
FIGS. 3, 4, 5, and 6 are diagrams illustrating a display frequency change according to an embodiment of the disclosure.

FIG. 2 is a diagram illustrating a pixel PXij according to an embodiment of the disclosure.

Referring to FIG. 2, the pixel PXij according to an embodiment of the disclosure may include a pixel circuit PXC and a light emitting element LD. The pixel circuit PXC may include transistors T1, T2, T3, T4, T5, and T6, a first capacitor Cst, and a second capacitor Chold.

Hereinafter, a circuit configured of an N-type transistor is described as an example. However, a person skilled in the art is able to design a circuit configured of a P-type transistor by varying a polarity of a voltage applied to a gate terminal. Similarly, a person skilled in the art is able to design a circuit configured of a combination of a P-type transistor and an N-type transistor. The P-type transistor collectively refers to a transistor in which a current amount increases when a voltage difference between a gate electrode and a source electrode increases in a negative direction. The N-type transistor collectively refers to a transistor in which a current amount increases when a voltage difference between a gate electrode and a source electrode increases in a positive direction. The transistor may be configured in various forms, such as a thin film transistor (TFT), a field effect transistor (FET), and a bipolar junction transistor (BJT).

Hereinafter, it is assumed that the transistors T1, T2, T3, T4, T5, and T6 are configured of N-type oxide semiconductor transistors. In an embodiment, the transistors T1, T2, T3, T4, T5, and T6 may be P-type silicon semiconductor transistors. In an embodiment, a portion of the transistors T1, T2, T3, T4, T5, and T6 may be an N-type oxide semiconductor transistor, and another portion may be a P-type silicon semiconductor transistor.

The oxide semiconductor transistor may be a low temperature polycrystalline oxide (LTPO) thin film transistor in which an active pattern (semiconductor layer) includes oxide. However, this is an example, and the N-type transistors are not limited thereto. For example, the active pattern (semiconductor layer) included in the N-type transistor may include an inorganic semiconductor (for example, amorphous silicon, poly silicon, an organic semiconductor, or the like). The silicon semiconductor transistor may be a low temperature poly-silicon (LTPS) thin film transistor in which the active pattern (semiconductor layer) includes amorphous silicon, poly silicon, or the like.

The first transistor T1 may have a first gate electrode connected to a first node N1 and a second gate electrode connected to a third node N3. The second gate electrode of the first transistor T1 may be for adjusting a characteristic of an output current compared to an input voltage of the first transistor T1. For example, the first transistor T1 mainly operates in a saturation state. At this time, the second gate electrode of the first transistor T1 does not exist, a magnitude of the output current may vary according to a change of a drain-source voltage, even though the gate-source voltage is the same. According to the present embodiment, as the characteristic of the first transistor T1 is adjusted to be insensitive to the change of the drain-source voltage, the first transistor T1 may output substantially the same current with respect to the same gate-source voltage. The first transistor T1 may control a driving current amount flowing from a first power voltage ELVDD to a second power voltage ELVSS. Therefore, the first transistor T1 may be referred to as a driving transistor. A first electrode of the first transistor T1 may be connected to a second node N2, and a second electrode may be connected to the third node N3.

The second transistor T2 may have a gate electrode connected to the first scan line GWi, a first electrode connected to the data line DLj, and a second electrode connected to the first node N1. The second transistor T2 may receive the data voltage applied to the data line DLj.

The third transistor T3 may have a gate electrode connected to the third scan line GRi, a first electrode receiving a reference voltage VREF, and a second electrode connected to the first node N1. The reference voltage VREF may be supplied from a reference voltage source. The third transistor T3 may apply the reference voltage VREF to the first node N1 to initialize a voltage of the first node N1 to the reference voltage VREF.

The fourth transistor T4 may have a gate electrode connected to the second scan line GIi, a first electrode receiving an initialization voltage VAINT, and a second electrode connected to a fourth node N4. The initialization voltage VAINT may be supplied from an initialization voltage source. The fourth transistor T4 may apply the initialization voltage VAINT to the fourth node N4 to initialize a voltage of the fourth node N4 to the initialization voltage VAINT. Therefore, the fourth transistor T4 may be referred to as an initialization transistor.

The initialization transistor (for example, the fourth transistor T4) may supply the initialization voltage VAINT to the anode electrode (for example, the fourth node N4) of the light emitting element LD when receiving the initialization signal (for example, the second scan signal) of the turn-on level, and supply of the initialization voltage VAINT may be stopped when the initialization signal of the turn-off level is received.

The fifth transistor T5 may have a gate electrode connected to the first emission line EMi, a first electrode receiving the first power voltage ELVDD, and a second electrode connected to the second node N2. The fifth transistor T5 may control opening and closing of a driving current path from the first power voltage ELVDD to the second power voltage ELVSS. Therefore, the fifth transistor T5 may be referred to as an emission transistor.

The emission transistor (for example, the fifth transistor T5) may pass the driving current when receiving the emission signal (for example, the first emission signal) of the turn-on level, and block the driving current when receiving the emission signal of the turn-off level.

The sixth transistor T6 may have a gate electrode connected to the second emission line EMBi, a first electrode connected to the third node N3, and a second electrode connected to the fourth node N4. The sixth transistor T6 may control opening and closing of the driving current path from the first power voltage ELVDD to the second power voltage ELVSS.

The first capacitor Cst may connect the first node N1 and the third node N3. A first electrode of the second capacitor Chold may receive the first power voltage ELVDD, and a second electrode may be connected to the third node N3. A first electrode of the second capacitor Chold may be connected to a constant voltage source other than a voltage source providing the first power voltage ELVDD. For example, the first electrode of the second capacitor Chold may be connected to an initialization voltage source providing the initialization voltage VAINT. As another example, the first electrode of the second capacitor Chold may be connected to a reference voltage source providing the reference voltage VREF.

The light emitting element LD may have an anode connected to the fourth node N4 and a cathode electrode receiving the second power voltage ELVSS. The light emitting element LD may be a light emitting diode. The light emitting element LD may be configured of an organic light emitting element (organic light emitting diode), an inorganic light emitting element (inorganic light emitting diode), a quantum dot/well light emitting element (quantum dot/well light emitting diode), or the like. In the present embodiment, only one light emitting element LD is provided in each pixel, but in an embodiment, a plurality of light emitting elements may be provided in each pixel. At this time, the plurality of light emitting element may be connected in series, parallel, series-parallel, or the like. The light emitting element LD of each pixel PXij may emit light in one of a first color, a second color, and a third color.

FIGS. 3 to 6 are diagrams illustrating a display frequency change according to an embodiment of the disclosure.

The display device 10 may support a variable refresh rate. A refresh rate may be a frequency at which the data voltage is written to the pixel PXij, may also be referred to as a screen scan rate or a screen reproduction rate, and may represent the number of image frames played during one second.

Figure 4:
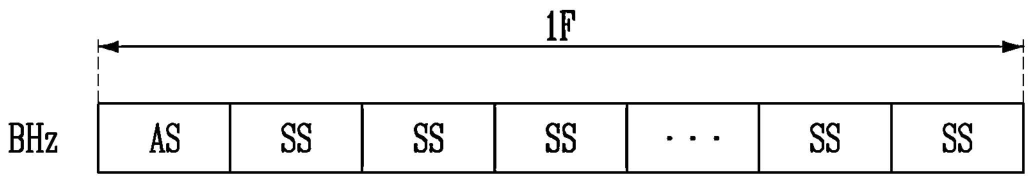

The pixel unit 14 may display an image at a first frequency AHz in a first mode (refer to FIG. 3), and display an image at a second frequency BHz less than the first frequency AHz in a second mode (refer to FIG. 4).

For example, in the first mode, each frame period 1F may include one address scan period AS and one self scan period SS with respect to each pixel PXij. For example, in the second mode, each frame period 1F may include one address scan period AS and a plurality of self scan periods SS with respect to each pixel PXij. As the second frequency BHz decreases, the number of self scan periods SS included in one frame period 1F may increase. As another example, in a specific mode, each frame period 1F may include only one address scan period AS and may not include the self scan period SS with respect to each pixel PXij.

The address scan period AS is a period in which the data voltage is written to the pixel PXij. The address scan period AS may be referred to as a data programming period in which the data voltage is received from the data line DLj.

The self scan period SS is a period in which the data voltage is not written to the pixel PXij. During an emission period of the self scan period SS, the pixel PXij may emit light using the data voltage written in the address scan period AS. For example, a length of the self scan period SS may be the same as a length of the address scan period AS.

Figure 5:
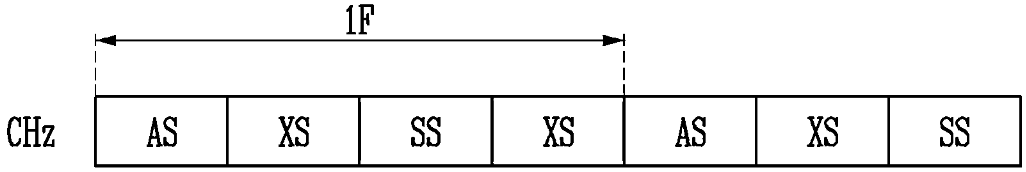
Figure 6:
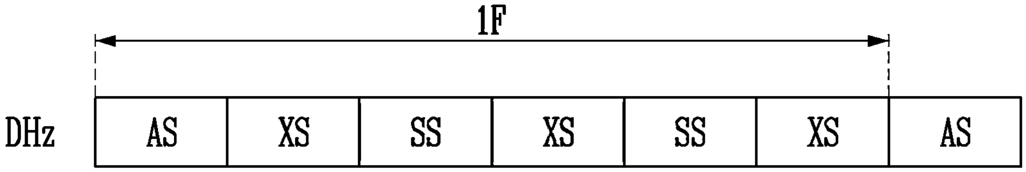

The pixel unit 14 may display an image at a third frequency CHz in a third mode (refer to FIG. 5), and display an image at a fourth frequency DHz less than the third frequency CHz in a fourth mode (refer to FIG. 6).

The third and fourth modes may include an auxiliary scan period XS following the address scan period AS and an auxiliary scan period XS following the self scan period SS.

The auxiliary scan period XS may be similar to the self scan period SS in that the auxiliary scan period XS is a period in which the data voltage is not written to the pixel PXij. During the emission period of the auxiliary scan period XS, the pixel PXij may emit light using the data voltage written in the address scan period AS. For example, a length of the auxiliary scan period XS may be the same as the length of the address scan period AS. However, the auxiliary scan period XS is different from the self scan period SS in that the second scan signal of the turn-on level is not supplied. This refers to a subsequent description of FIGS. 8 and 9.

The display device 10 is not necessarily required to be driven by including all of the first mode, the second mode, the third mode, and the fourth mode. The display device 10 may be driven in only at least one of the first mode, the second mode, the third mode, and the fourth mode. For example, the display device 10 may be driven in only one of the first mode, the second mode, the third mode, and the fourth mode. In addition, the display device 10 may be driven in only the first mode and the second mode, and may not be driven in the third mode and the fourth mode. The display device 10 may be driven in only the third mode and fourth mode, and may not be driven in the first mode and the second mode.

Figure 7:
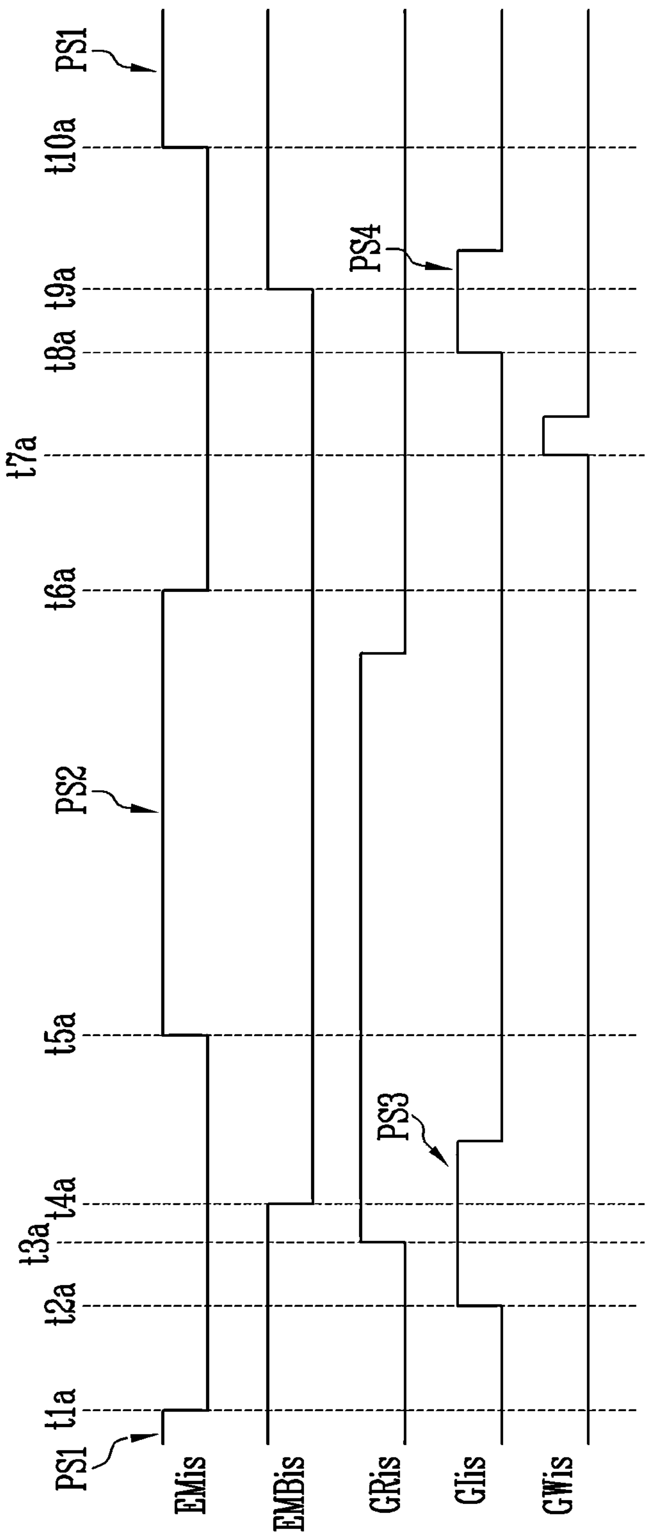
FIG. 7 is a diagram illustrating an address scan period according to an embodiment of the disclosure.

FIG. 7 is a diagram illustrating an address scan period according to an embodiment of the disclosure.

The address scan period of FIG. 7 is an example of the address scan period AS of FIGS. 3 to 6. Hereinafter, the disclosure is described based on a pixel row connected to the i-th scan lines GWi, GIi, and GRi and the i-th emission lines Emi and EMBi.

First, at a first time point t1*a*, a first emission signal EMis of a turn-off level (for example, a low level) may be applied to the first emission line EMi. Accordingly, the fifth transistor T5 is turned off, and an emission period based on a data voltage written in a previous frame period is ended.

At a second time point t2*a*, a second scan signal GIis of a turn-on level (for example, a high level) is applied to the second scan line GIi, and thus the fourth transistor T4 may be turned on. Accordingly, the initialization voltage VAINT may be applied to the fourth node N4. Therefore, an anode voltage of the light emitting element LD may be initialized. At this time, since the sixth transistor T6 is turned on, the initialization voltage VAINT may also be applied to the third node N3. Therefore, a voltage of the second electrode of the second capacitor Chold may be initialized.

At a time point t3*a*, a third scan signal GRis of a turn-on level may be applied to the third scan line GRi, and thus the third transistor T3 may be turned on. Accordingly, the reference voltage VREF may be applied to the first node N1. Therefore, a both end voltage of the first capacitor Cst may be initialized.

At a time point t4*a*, a second emission signal EMBis of a turn-off level may be applied to the second emission line EMBi, and thus the sixth transistor T6 may be turned off. Accordingly, the third node N3 and the fourth node N4 may be electrically separated.

At a time point t5*a*, the first emission signal EMis of the turn-on level may be applied to the first emission line EMi, and thus the fifth transistor T5 may be turned on. As described above, the both end voltage of the first capacitor Cst is initialized, and at the time point t5*a*, the first capacitor Cst may be in a state in which a voltage difference between the gate electrode (first node N1) and the source electrode (third node N3) of the first transistor T1 is maintained higher than a threshold voltage of the first transistor T1. Therefore, at the time point t5*a*, the first transistor T1 may be turned on. At this time, since a current is supplied from the first power voltage ELVDD through the turned-on fifth transistor T5 and first transistor T1, a voltage of the third node N3 may gradually increase. When the voltage difference between the gate electrode (first node N1) and the source electrode (third node N3) of the first transistor T1 reaches the threshold voltage of the first transistor T1, the first transistor T1 may be turned off, and the voltage of the third node N3 may be maintained. Accordingly, the first capacitor Cst may store a voltage corresponding to the threshold voltage of the first transistor T1. A period in which the voltage corresponding to the threshold voltage of the first transistor T1 is stored in the first capacitor Cst may be referred to as a compensation period. At a time point t6*a*, the first emission signal EMis of the turn-off level is supplied, and thus the compensation period is ended.

At a time point t7*a*, a first scan signal GWis of a turn-on level may be applied to the first scan line GWi, and thus the second transistor T2 may be turned on. At this time, the data voltage may be applied to the data line DLj, and the data voltage may be written to the first node N1. The voltage of the third node N3 may vary according to a capacitance ratio of the capacitors Cst and Chold and the voltage of the third node N3 previously stored in the compensation period.

At a time point t8*a*, a second scan signal GIis of a turn-on level may be applied to the second scan line GIi, and thus the fourth transistor T4 may be turned on. Therefore, the anode voltage of the light emitting element LD may be initialized to the initialization voltage VAINT, and thus expressing a low grayscale such as a black grayscale may be effective.

At a time point t9a, a second emission signal EMBis of a turn-on level may be applied to the second emission line EMBi, and thus the sixth transistor T6 may be turned on. Accordingly, the first transistor T1 may be connected to the anode of the light emitting element LD.

At a time point t10a, the first emission signal EMis of a turn-on level may be applied to the first emission line EMi, and thus the fifth transistor T5 may be turned on. Accordingly, a driving current path connected through the first power voltage ELVDD, the fifth transistor T5, the first transistor T1, the sixth transistor T6, and the second power voltage ELVSS may be generated, and the light emitting element LD may emit light with a luminance based on a driving current flowing along the driving current path. For example, the light emitting element LD may emit light with a luminance corresponding to an amount of the driving current.

The first emission signal EMis may sequentially include a first pulse PS1 and a second pulse PS2 of a turn-on level. The first emission signal EMis may alternately include a plurality of first pulses PS1 and a plurality of second pulses PS2.

A length of the first pulse PS1 may be longer than a length of the second pulse PS2. The length of the first pulse PS1 may determine an emission period of the pixel PXij. For example, as the length of the first pulse PS1 increases, the luminance of the pixel PXij may increase, and as the length of the first pulse PS1 decreases, the luminance of the pixel PXij may decrease. That is, adjusting a duty ratio of the first emission signal EMis may mean adjusting the length of the first pulse PS1.

The length of the second pulse PS2 may be the same as a length of a compensation period t5a to t6a. The length of the second pulse PS2 may be fixed. That is, even though the duty ratio of the first emission signal EMis changes, the length of the second pulse PS2 may be maintained.

The second scan signal GIis may sequentially include a third pulse PS3 and a fourth pulse PS4 of a turn-on level. The second scan signal GIis may alternately include a plurality of third pulses PS3 and a plurality of fourth pulses PS4.

The third pulse PS3 may be generated in a period between the first pulse PS1 and the second pulse PS2. The fourth pulse PS4 may be generated after the second pulse PS2. The fourth pulse PS4 may be generated in a period between the second pulse PS2 and the next first pulse PS1.

Figure 8:
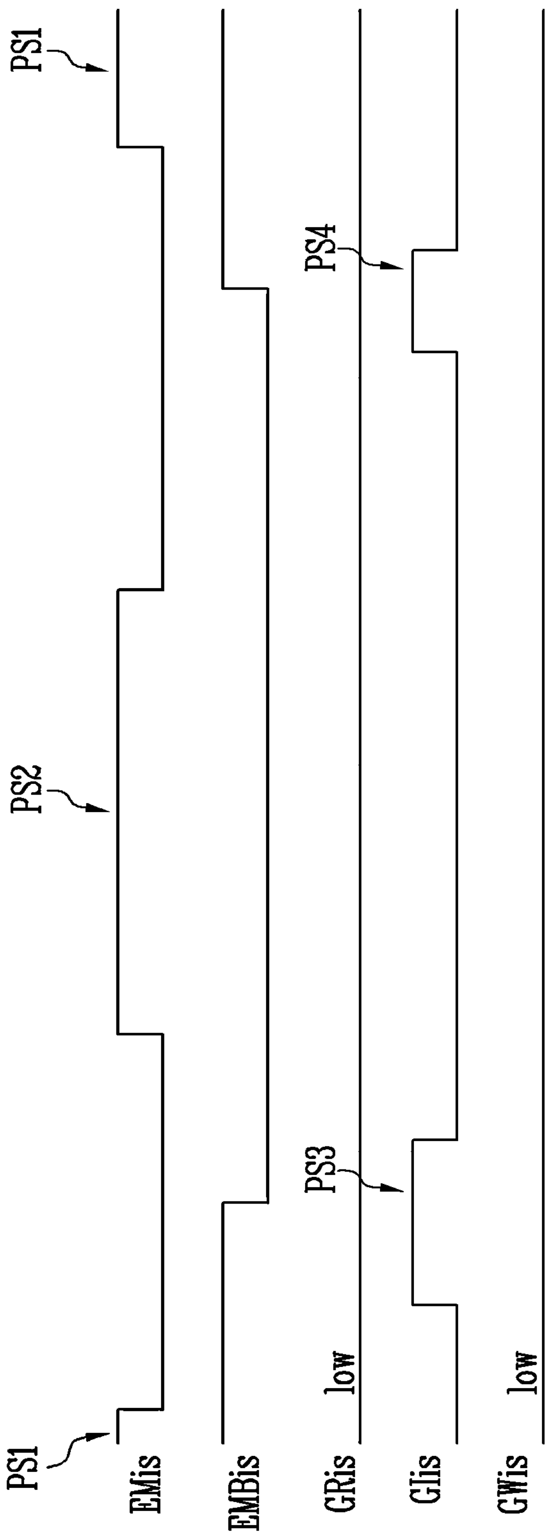
FIG. 8 is a diagram illustrating a self scan period according to an embodiment of the disclosure.

FIG. 8 is a diagram illustrating a self scan period according to an embodiment of the disclosure.

The self scan period of FIG. 8 is an example of the self scan period SS of FIGS. 3 to 6. During the self scan period of FIG. 8, the first emission signal EMis, the second emission signal EMBis, and the second scan signal GIis may have the same waveform as the signals of the address scan period of FIG. 7. However, the first scan signal GWis and the third scan signal GRis may maintain a turn-off level. Accordingly, the first node N1 may be in a floating state, and a both end voltage difference of the first capacitor Cst may be maintained. Therefore, a luminance of the light emitting element LD after the self scan period of FIG. 8 may be the same as a luminance of the light emitting element LD after an immediately previous address scan period.

Figure 9:
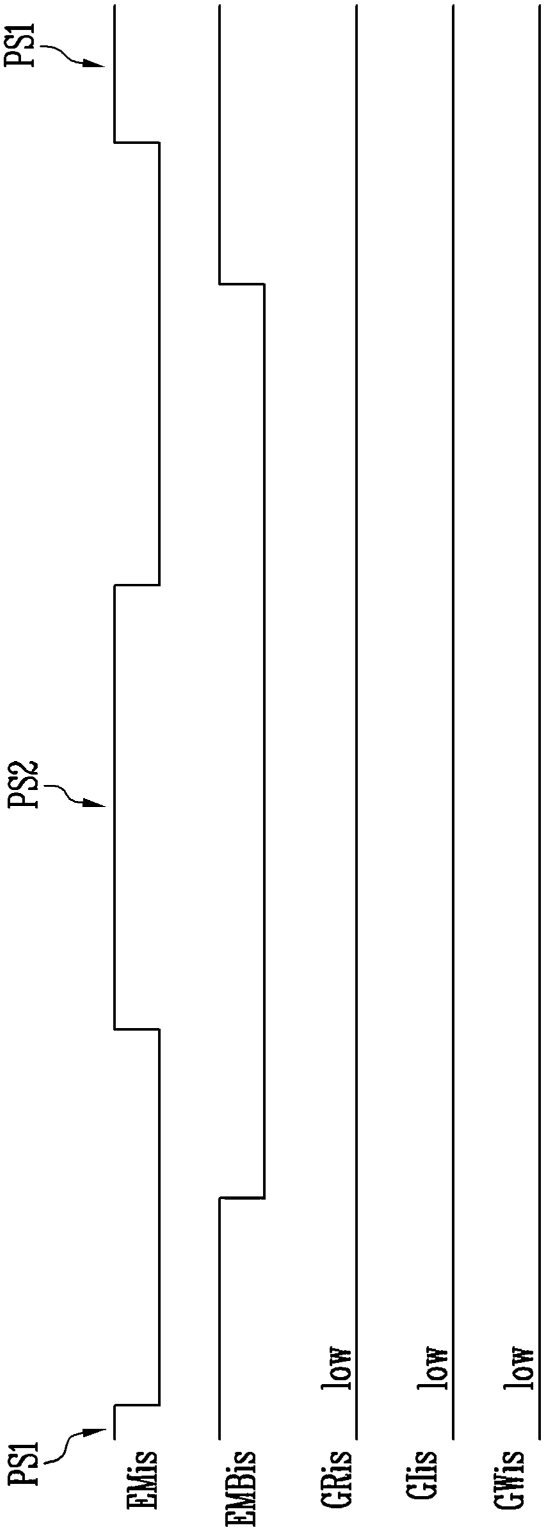
FIG. 9 is a diagram illustrating an auxiliary scan period according to an embodiment of the disclosure.

FIG. 9 is a diagram illustrating an auxiliary scan period according to an embodiment of the disclosure.

The auxiliary scan period of FIG. 9 is an example of the auxiliary scan period XS of FIGS. 5 and 6. During the auxiliary scan period of FIG. 9, the first emission signal EMis and the second emission signal EMBis may have the same waveform as the signals of the address scan period of FIG. 7. However, the first scan signal GWis, the second scan signal GIis, and the third scan signal GRis may maintain a turn-off level. Accordingly, the first node N1 may be in a floating state, and the both end voltage difference of the first capacitor Cst may be maintained. Therefore, the luminance of the light emitting element LD after the auxiliary scan period of FIG. 9 may be the same as the luminance of the light emitting element LD after the immediately previous address scan period.

Figure 10:
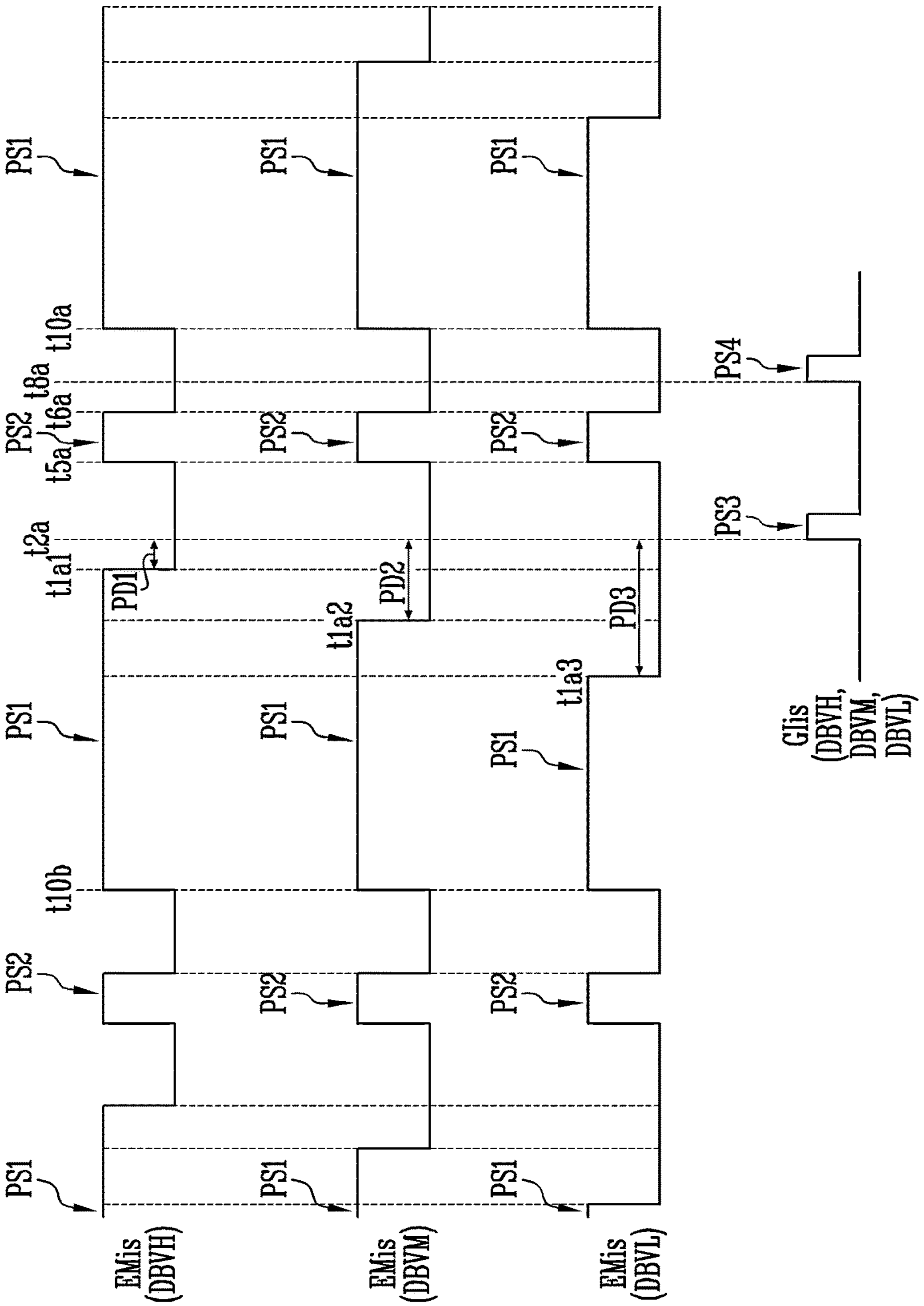
FIG. 10 is a diagram illustrating an emission signal and an initialization signal according to a change of a maximum luminance according to an embodiment of the disclosure.

FIG. 10 is a diagram illustrating an emission signal and an initialization signal according to a maximum luminance change according to an embodiment of the disclosure. The emission signal may indicate the first emission signal EMis. The initialization signal may indicate the second scan signal GIis.

Referring to FIG. 10, waveforms of different first emission signals EMis for different maximum luminances DBVH, DBVM, and DBVL are exemplarily shown. At this time, a waveform of the second scan signal GIis may be applied equally to the different maximum luminances DBVH, DBVM, and DBVL.

The first emission driver 15EM (see FIG. 1 for example) may decrease a duty ratio of the first emission signal EMis as the maximum luminance decreases. For example, it is assumed that the second maximum luminance DBVM is lower than the first maximum luminance DBVH and the third maximum luminance DBVL is lower than the second maximum luminance DBVM. At this time, the duty ratio of the first emission signal EMis at the second maximum luminance DBVM may be less than the duty ratio of the first emission signal EMis at the first maximum luminance DBVH. In addition, the duty ratio of the first emission signal EMis at the third maximum luminance DBVL may be less than the duty ratio of the first emission signal EMis at the second maximum luminance DBVM.

At this time, decreasing the duty ratio may mean decreasing the length of the first pulse PS1. Referring to FIGS. 7 to 9, the second pulse PS2 overlaps a period when the second emission signal EMBis is at the turn-off level (that is, the low level). When the second emission signal EMBis is at the turn-off level, the sixth transistor T6 is in a turn-off state, and thus the light emitting element LD is in a non-emission state. Therefore, the second pulse PS2 does not contribute to the emission period.

By changing a start time point t10b of the first pulse PS1 or an end time point t1a (refer to FIG. 7) of the first pulse PS1, the length of the first pulse PS1 (that is, the width of the first pulse PS1) may change. In the embodiment of FIG. 10, the start time point t10b of the first pulse PS1 is fixed and end time points t1a1, t1a2, and t1a3 of the first pulse PS1 are changed, to change the length of the first pulse PS1 (that is, the width of the first pulse PS1). The width t10b to t1a2 of the first pulse PS1 at the second maximum luminance DBVM may be less than the width t10b to t1a1 of the first pulse PS1 at the first maximum luminance DBVH. In addition, the width t10b to t1a3 of the first pulse PS1 at the third maximum luminance DBVL may be less than the width t10b to t1a2 of the first pulse PS1 at the second maximum luminance DBVM.

At this time, when the end time point t1a of the first pulse PS1 changes (refer to FIG. 7), a start time point t2a of the third pulse PS3 may be maintained. Therefore, a time interval PD2 between the end time point t1a2 of the first pulse PS1 and the start time point t2a of the third pulse PS3 at the second maximum luminance DBVM may be greater than a time interval PD1 between the end time point t1a1 of the first pulse PS1 and the start time point t2*a* of the third pulse PS3 at the first maximum luminance DBVH. Similarly, a time interval PD3 between the end time point t1*a*3 of the first pulse PS1 and the start time point t2*a* of the third pulse PS3 at the third maximum luminance DBVL may be greater than the time interval PD2 between the end time point t1*a*2 of the first pulse PS1 and the start time point t2*a* of the third pulse PS3 at the second maximum luminance DBVM.

In an embodiment, when the width of the first pulse PS1 changes, the width of the second pulse PS2 may be maintained. In addition, when the width of the first pulse PS1 changes, the width of the third pulse PS3 and the width of the fourth pulse PS4 may be maintained. This is because when the widths of the second to fourth pulses PS2, PS3, and PS4 change, a relative timing with other signals (refer to a driving timing of FIG. 7) may change.

In an embodiment, when the width of the first pulse PS1 changes, the widths of the second to fourth pulses PS2, PS3, and PS4 may change. At this time, a timing or a width of other signals may change so that the relative timing with the other signals is maintained.

Figure 11:
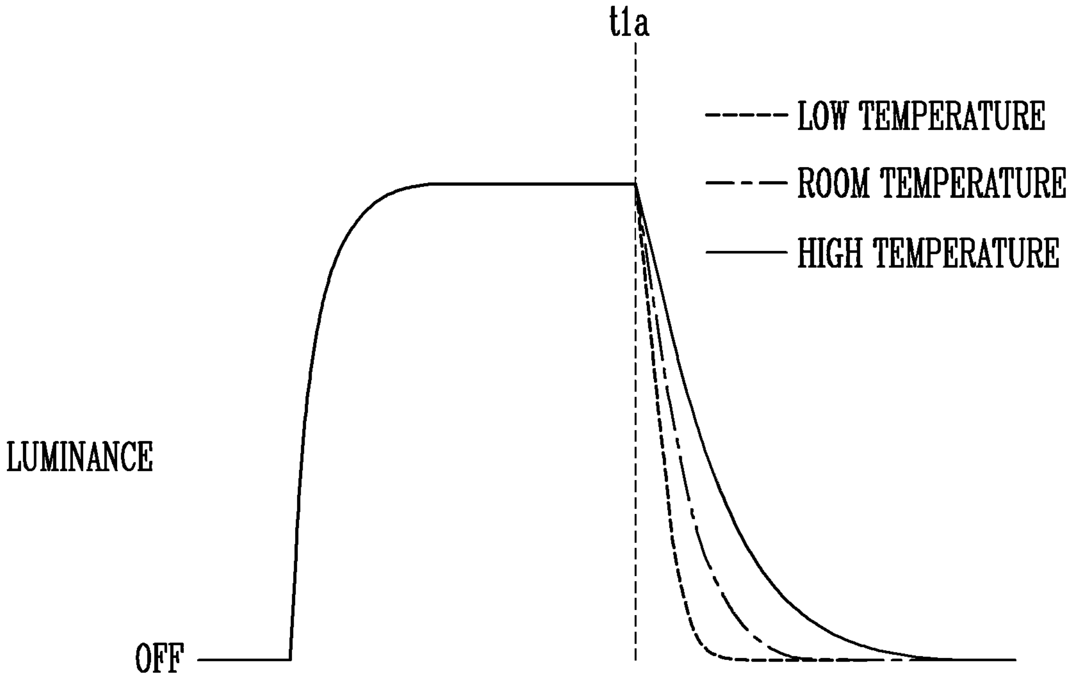
FIGS. 11 and 12 are diagrams illustrating a temperature sensitivity of a luminance according to the maximum luminance.
Figure 12:
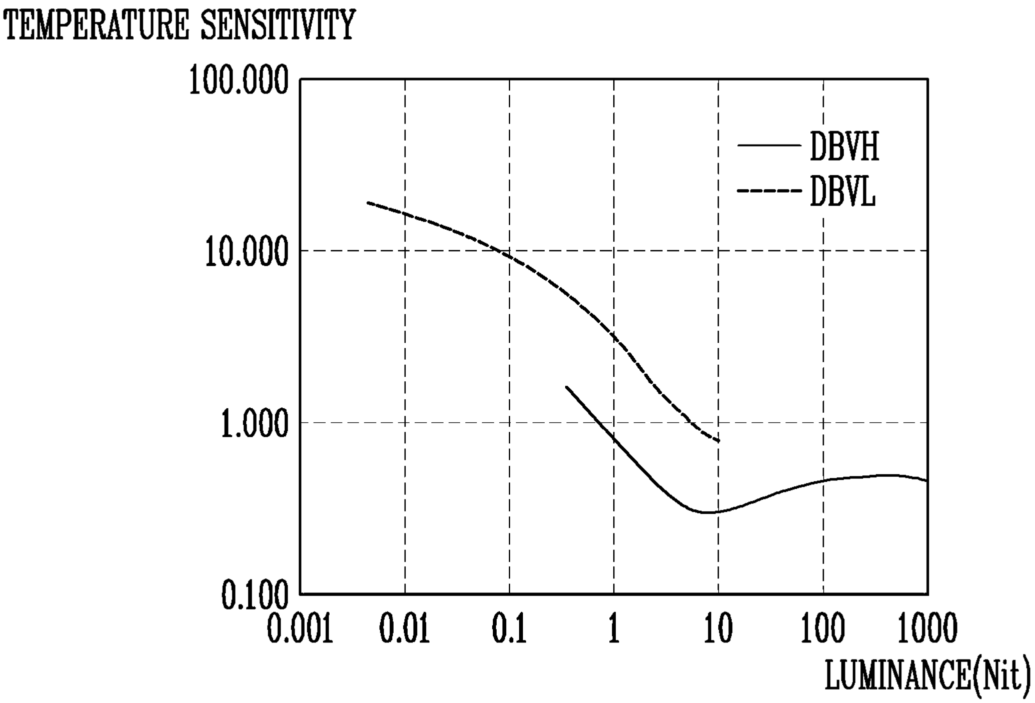

FIGS. 11 and 12 are diagrams illustrating a temperature sensitivity of a luminance according to the maximum luminance.

Referring to FIG. 11, the luminance of the pixel PXij corresponding to the first pulse PS1 is exemplarily shown. Ideally, the pixel PXij is changed to a non-emission state OFF at the end time point t1*a* of the first pulse PS1. However, a delay time required for the pixel PXij configured of an oxide semiconductor transistor to transit to the non-emission state OFF may vary according to the temperature. For example, the delay time of a time point when the pixel PXij becomes the non-emission state OFF from the time point t1*a* may increase as the temperature increases. A difference of the delay time may appear as a difference of a luminance.

Referring to FIG. 12, a graph where a horizontal axis represents a luminance Nit and a vertical axis represents a temperature sensitivity is exemplarily shown. The temperature sensitivity indicates a change amount of a luminance per 1 degree change in temperature, and in FIG. 12, a numerical value of the temperature sensitivity is expressed in a log scale. The first maximum luminance DBVH is assumed to be 1000 nits, and the third maximum luminance DBVL is assumed to be 10 nits. Referring to the graph, it may be seen that the temperature sensitivity appears high at a relatively low maximum luminance (that is, the third maximum luminance DBVL) even under the same luminance condition. This phenomenon may result from a fact that the period PD3 of the third maximum luminance DBVL is longer than the period PD1 of the first maximum luminance DBVH (refer to FIG. 10). After the period PD3 (or PD1) has elapsed, when the third pulse PS3 is generated, since the anode voltage of the light emitting element LD is initialized, the light emitting element LD may be in the non-emission state. At the first maximum luminance DBVH, even though the delay time of FIG. 11 is increased, since the light emitting element LD is switched to the non-emission state after the relatively short period PD1, the temperature sensitivity may be relatively low. At the third maximum luminance DBVL, since the light emitting element LD is switched to the non-emission state after the relatively long period PD3, the temperature sensitivity may be relatively high.

Since a fact that the temperature sensitivity is high means that a recognized luminance varies according to the temperature even though an image is the same, it is preferable that as the temperature sensitivity is low.

Figure 13:
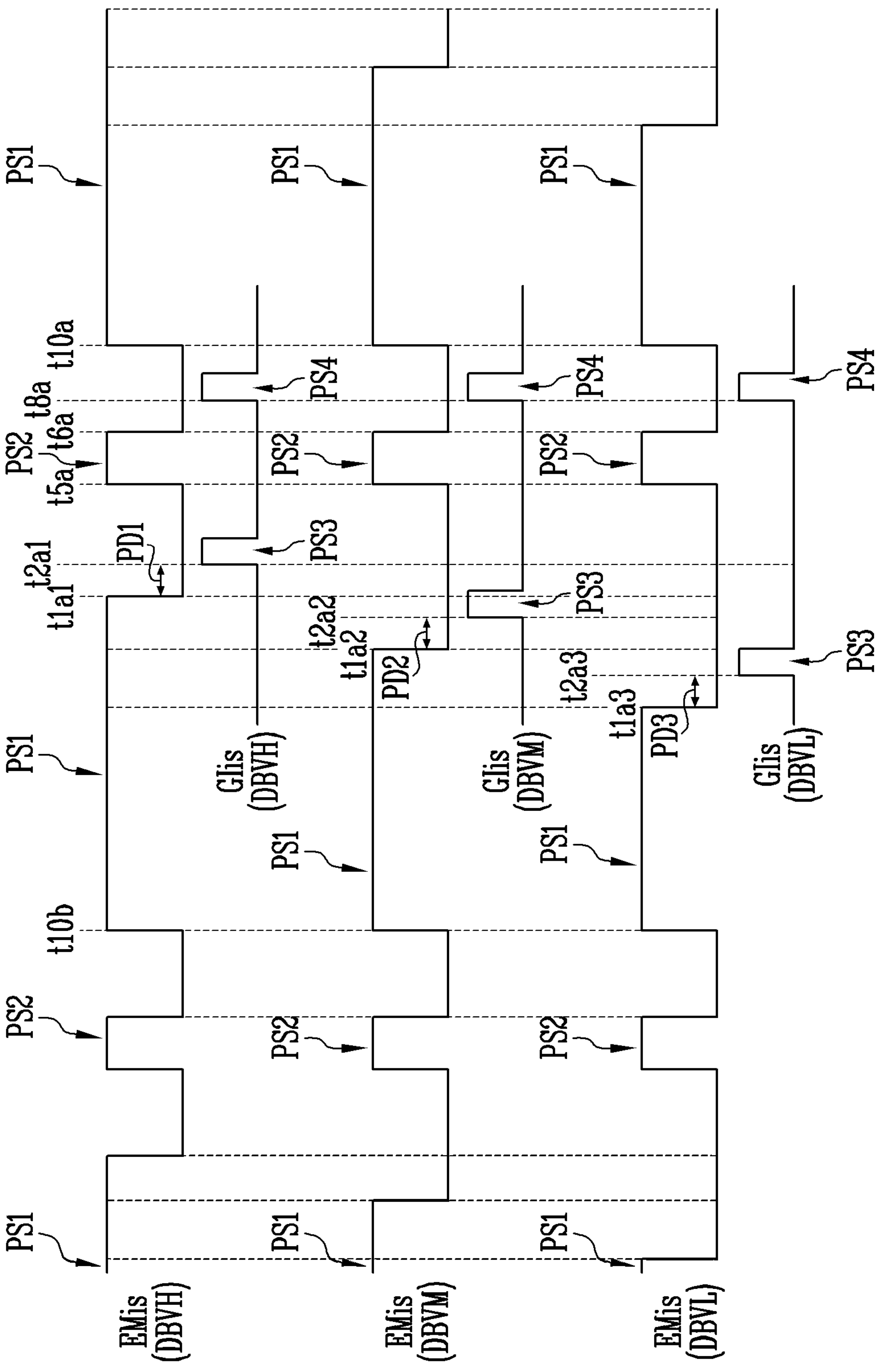
FIG. 13 is a diagram illustrating an emission signal and an initialization signal according to a change of a maximum luminance according to an embodiment of the disclosure.

FIG. 13 is a diagram illustrating an emission signal and an initialization signal according to a maximum luminance change according to an embodiment of the disclosure.

Referring to FIG. 13, waveforms of different first emission signals EMis for different maximum luminances DBVH, DBVM, and DBVL are exemplarily shown. At this time, waveforms of the second scan signals GIis may be applied differently to the different maximum luminances DBVH, DBVM, and DBVL.

Since the waveforms of the different first emission signals EMis for the different maximum luminances DBVH, DBVM, and DBVL are the same as those shown in FIG. 10, an overlapping description is omitted.

In the present embodiment, when the end time point t1*a* of the first pulse PS1 changes, the start time point t2*a* of the third pulse PS3 may change (refer to FIG. 7). For example, when the end time points t1*a*1, t1*a*2, and t1*a*3 of the first pulse PS1 become earlier, start time points t2*a*1, t2*a*2, and t2*a*3 of the third pulse PS3 may become earlier. At this time, regardless of the changed width of the first pulse PS1, time intervals PD1, PD2, and PD3 between the changed end time points t1*a*1, t1*a*2, and t1*a*3 of the first pulse PS1 and the changed start time points t2*a*1, t2*a*2, and t2*a*3 of the third pulse PS3 may be maintained. That is, at the different maximum luminances DBVH, DBVM, and DBVL, the periods PD1, PD2, and PD3 may be the same.

When comparing the embodiment of FIG. 10, according to the present embodiment, since the light emitting element LD is switched to the non-emission state after a short time (that is, the period PD3) even at the relatively low third maximum luminance DBVL, the temperature sensitivity may be decreased.

In an embodiment, the periods PD1, PD2, and PD3 may become 0. For example, at the first maximum luminance DBVH, the end time point t1*a*1 of the first pulse PS1 and the start time point t2*al* of the third pulse PS3 may be the same. Similarly, in the second maximum luminance DBVM, the end time point t1*a*2 of the first pulse PS1 and the start time point t2*a*2 of the third pulse PS3 may be the same. At the third maximum luminance DBVL, the end time point t1*a*3 of the first pulse PS1 and the start time point t2*a*3 of the third pulse PS3 may be the same.

In an embodiment, at the first maximum luminance DBVH, the start time point t2*al* of the third pulse PS3 may be earlier than the end time point t1*a*1 of the first pulse PS1. Similarly, in the second maximum luminance DBVM, the start time point t2*a*2 of the third pulse PS3 may be earlier than the end time point t1*a*2 of the first pulse PS1. At the third maximum luminance DBVL, the start time point t2*a*3 of the third pulse PS3 may be earlier than the end time point t1*a*3 of the first pulse PS1.

Figure 14:
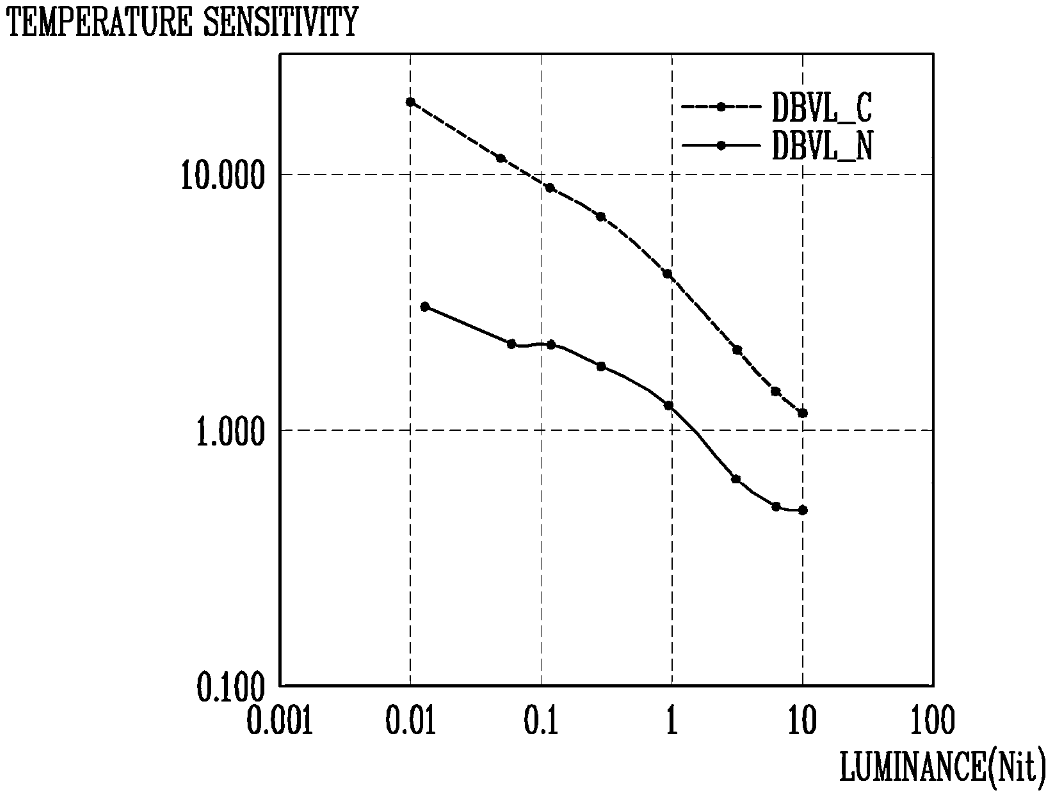
FIGS. 14, 15, and 16 are diagrams for comparing the embodiment of FIG. 10 and the embodiment of FIG. 13.
Figure 15:
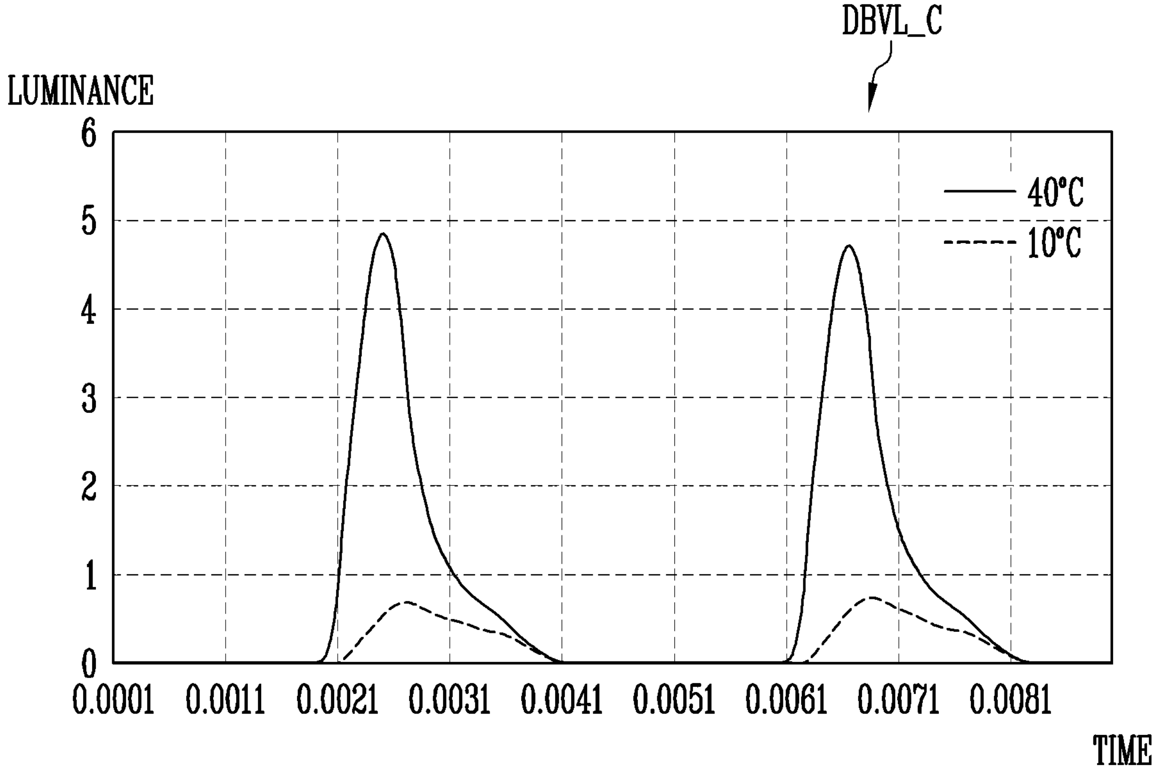
Figure 16:
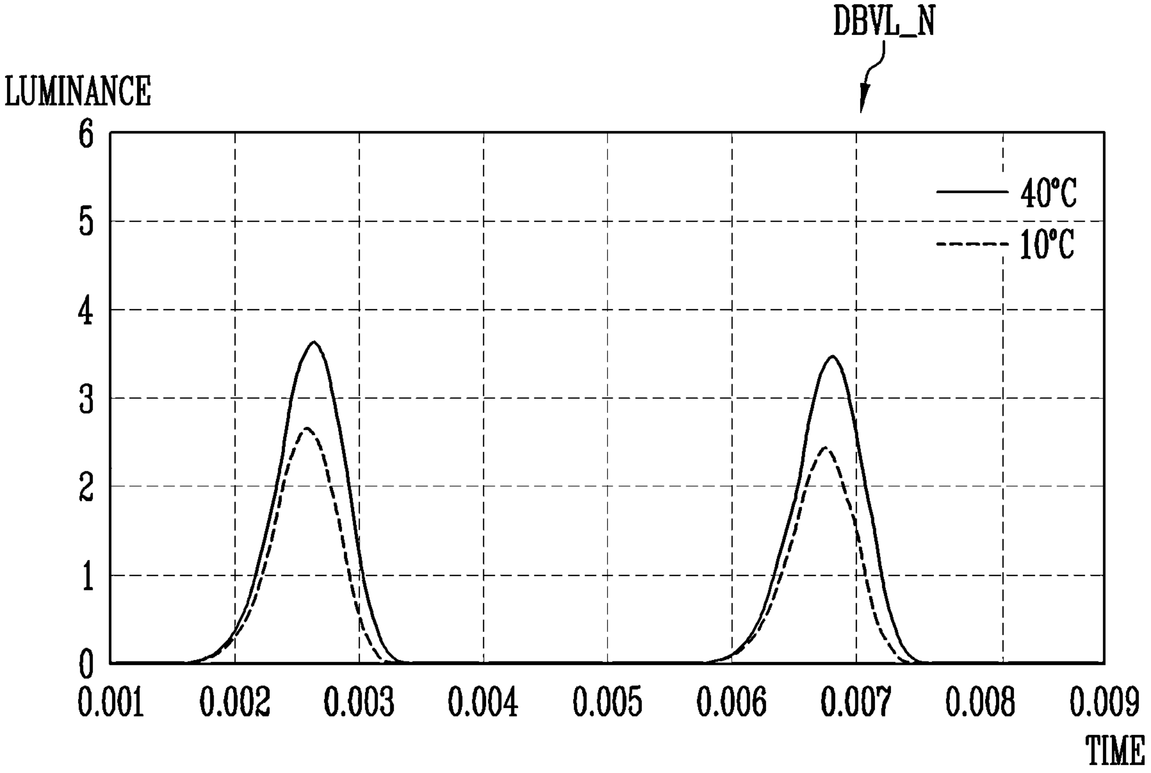

FIGS. 14 to 16 are diagrams for comparing the embodiment of FIG. 10 and the embodiment of FIG. 13.

Referring to FIG. 14, similarly to FIG. 12, a graph in which a horizontal axis represents a luminance Nit and a vertical axis represents a temperature sensitivity is exemplarily shown. A graph of the third maximum luminance DBVL_C is a case where the embodiment of FIG. 10 is applied, and a graph of the third maximum luminance DBVL_N is a case where the embodiment of FIG. 13 is applied. In the case of the embodiment of FIG. 13, it may be seen that the temperature sensitivity is further decreased in the entire luminance range.

Referring to FIGS. 15 and 16, a graph in which a horizontal axis represents a time and a vertical axis represent a luminance is exemplary shown. Referring to FIG. 15, it may be seen that when the embodiment of FIG. 10 is applied and the maximum luminance of the display device 10 is set to a third maximum luminance DBVL_C, a luminance difference according to the temperature (10 degrees and 40 degrees) is relatively large. Referring to FIG. 16, it may be seen that when the embodiment of FIG. 13 is applied and the maximum luminance of the display device 10 is set to a third maximum luminance DBVL_N, the luminance difference according to the temperature (10 degrees and 40 degrees) is relatively small.

Figure 17:
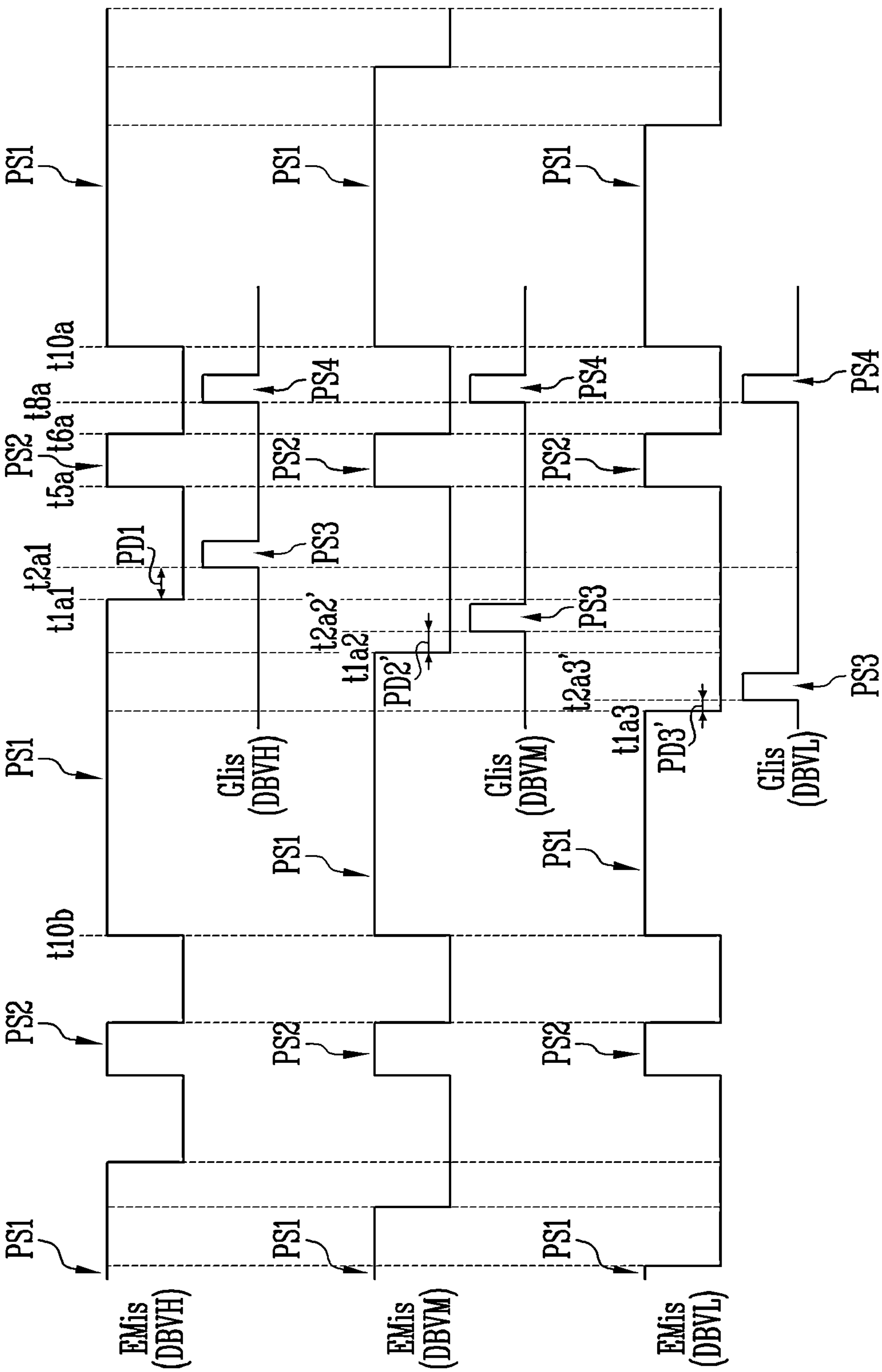
FIGS. 17 and 18 are diagrams illustrating an emission signal and an initialization signal according to a change of a maximum luminance according to embodiments of the disclosure.
Figure 18:
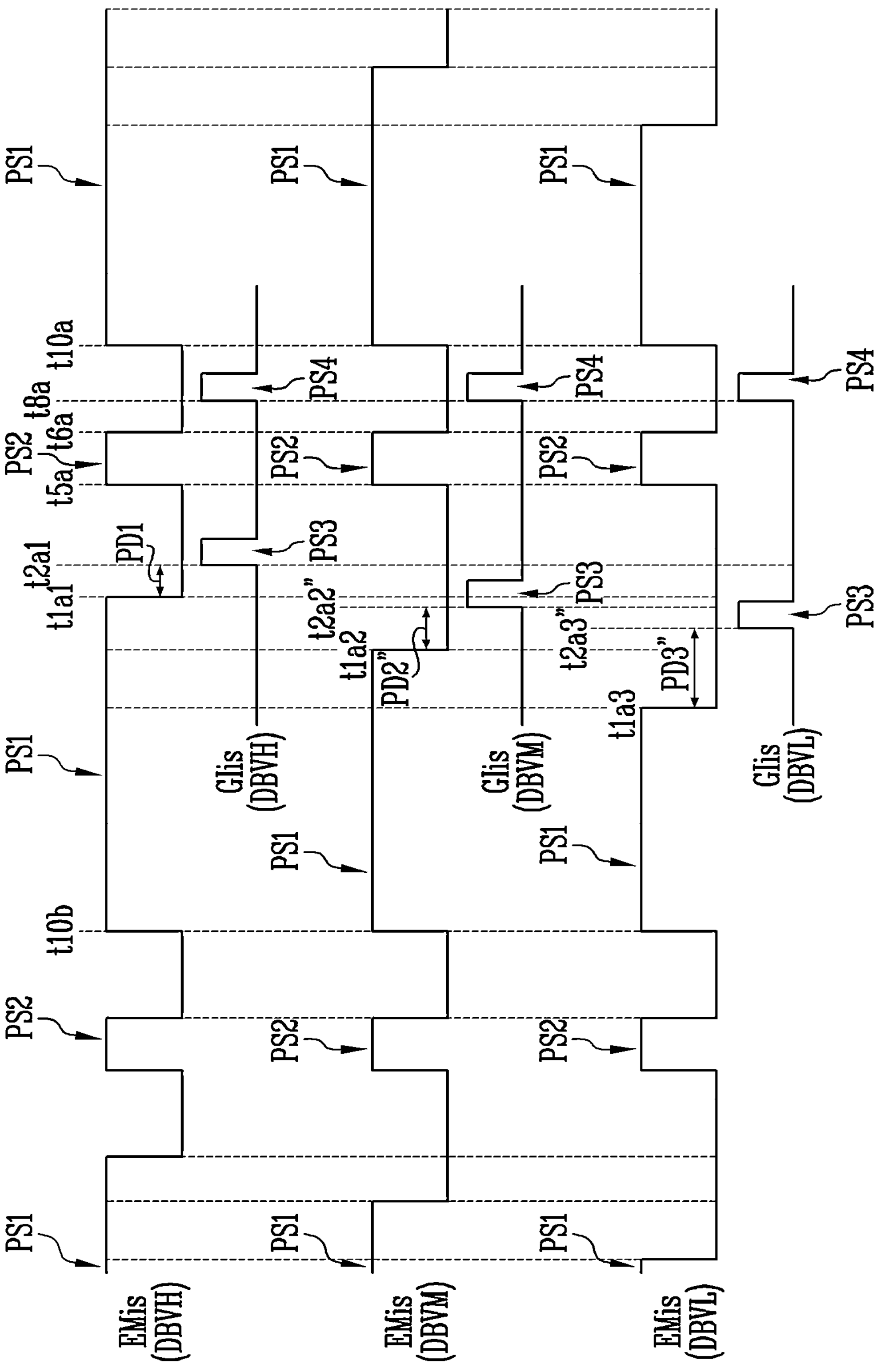

FIGS. 17 and 18 are diagrams illustrating an emission signal and an initialization signal according to a maximum luminance change according to still other embodiments of the disclosure.

Referring to FIG. 17, waveforms of different first emission signals EMis for different maximum luminances DBVH, DBVM, and DBVL are exemplarily shown. At this time, waveforms of the second scan signals GIis may be applied differently to the different maximum luminances DBVH, DBVM, and DBVL.

Since the waveforms of the different first emission signals EMis for the different maximum luminances DBVH, DBVM, and DBVL are the same as those shown in FIG. 10, an overlapping description is omitted.

In the present embodiment, when the end time point t1*a* of the first pulse PS1 changes, the start time point t2*a* of the third pulse PS3 may change (refer to FIG. 7). For example, when the end time points t1*a*1, t1*a*2, and t1*a*3 of the first pulse PS1 become earlier, start time points t2*a*1, t2*a*2', and t2*a*3' of the third pulse PS3 may become earlier. At this time, as the changed width of the first pulse PS1 decreases, time intervals PD1, PD2', and PD3' between the changed end time points t1*a*1, t1*a*2, and t1*a*3 of the first pulse PS1 and the changed start time points t2*a*1, t2*a*2', and t2*a*3' of the third pulse PS3 may be decreased. That is, at the different maximum luminances DBVH, DBVM, the DBVL, the periods PD1, PD2', and PD3' may be different.

According to the present embodiment, as the temperature sensitivity of the maximum luminance (for example, the third maximum luminance DBVL) is relatively high, the third pulse PS3 may be caused to be generated earlier to further reduce a luminance difference according to the temperature sensitivity.

In an embodiment, at least one of the periods PD1, PD2', and PD3' may become 0. For example, at the first maximum luminance DBVH, the end time point t1*a*1 of the first pulse PS1 and the start time point t2*al* of the third pulse PS3 may be the same. In an embodiment, at the second maximum luminance DBVM, the end time point t1*a*2 of the first pulse PS1 and the start time point t2*a*2' of the third pulse PS3 may be the same. In an embodiment, at the third maximum luminance DBVL, the end time point t1*a*3 of the first pulse PS1 and the start time point t2*a*3' of the third pulse PS3 may be the same.

In an embodiment, at the first maximum luminance DBVH, the start time point t2*al* of the third pulse PS3 may be earlier than the end time point t1*a*1 of the first pulse PS1. In an embodiment, at the second maximum luminance DBVM, the start time point t2*a*2' of the third pulse PS3 may be earlier than the end time point t1*a*2 of the first pulse PS1. In an embodiment, at the third maximum luminance DBVL, the start time point t2*a*3' of the third pulse PS3 may be earlier than the end time point t1*a*3 of the first pulse PS1.

Referring to FIG. 18, waveforms of different first emission signals EMis for different maximum luminances DBVH, DBVM, and DBVL are exemplarily shown. At this time, waveforms of the second scan signals GIis may be applied differently to the different maximum luminances DBVH, DBVM, and DBVL.

Since the waveforms of the different first emission signals EMis for the different maximum luminances DBVH, DBVM, and DBVL are the same as those shown in FIG. 10, an overlapping description is omitted.

In the present embodiment, when the end time point t1*a* of the first pulse PS1 changes, the start time point t2*a* of the third pulse PS3 may change (refer to FIG. 7). For example, when the end time points t1*a*1, t1*a*2, and t1*a*3 of the first pulse PS1 become earlier, start time points t2*a*1, t2*a*2", and t2*a*3" of the third pulse PS3 may become earlier. At this time, as the changed width of the first pulse PS1 decreases, time intervals PD1, PD2", and PD3" between the changed end time points t1*a*1, t1*a*2, and t1*a*3 of the first pulse PS1 and the changed start time points t2*a*1, t2*a*2", and t2*a*3" may increase. That is, at the different maximum luminances DBVH, DBVM, and DBVL, the periods PD1, PD2", and PD3" may be different.

When comparing the embodiment of FIG. 10, according to the present embodiment, since the light emitting element LD is switched to the non-emission state after a short time (that is, the period PD3") even at the relatively low third maximum luminance DBVL, the temperature sensitivity may be decreased.

In an embodiment, at least one of the periods PD1, PD2", and PD3" may become 0. For example, at the first maximum luminance DBVH, the end time point t1*a*1 of the first pulse PS1 and the start time point t2*al* of the third pulse PS3 may be the same. In an embodiment, at the second maximum luminance DBVM, the end time point t1*a*2 of the first pulse PS1 and the start time point t2*a*2" of the third pulse PS3 may be the same. In an embodiment, at the third maximum luminance DBVL, the end time point t1*a*3 of the first pulse PS1 and the start time point t2*a*3" of the third pulse PS3 may be the same.

In an embodiment, at the first maximum luminance DBVH, the start time point t2*al* of the third pulse PS3 may be earlier than the end time point t1*a*1 of the first pulse PS1. In an embodiment, at the second maximum luminance DBVM, the start time point t2*a*2" of the third pulse PS3 may be earlier than the end time point t1*a*2 of the first pulse PS1. In an embodiment, at the third maximum luminance DBVL, the start time point t2*a*3" of the third pulse PS3 may be earlier than the end time point t1*a*3 of the first pulse PS1.

Figure 19:
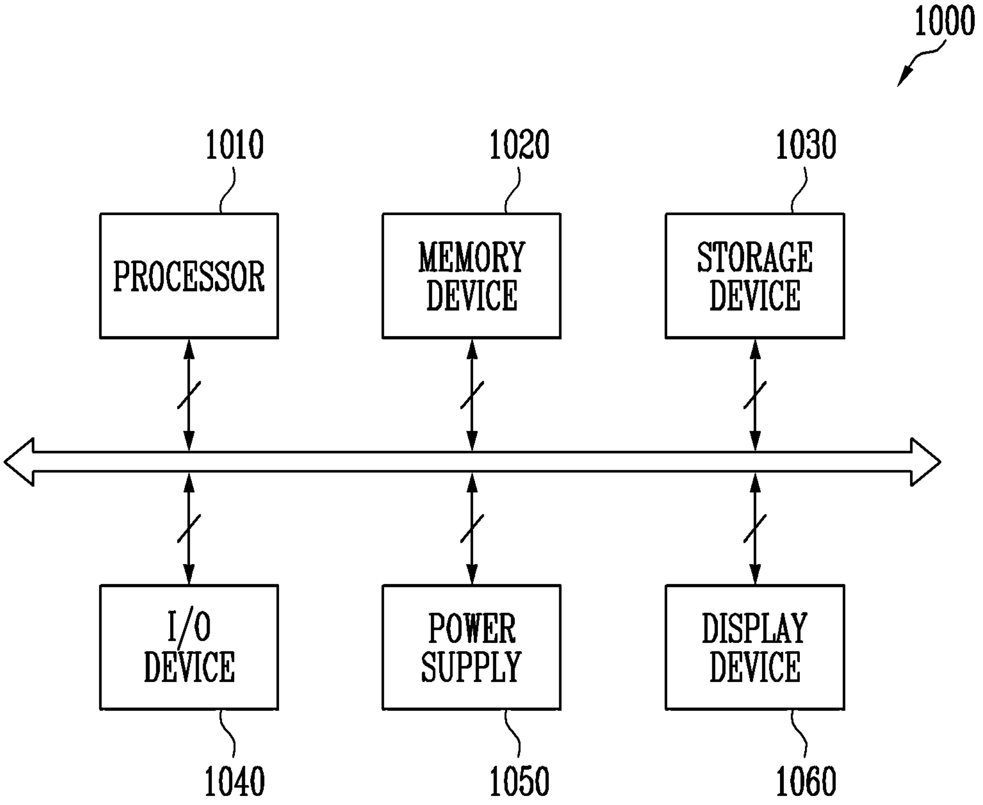
FIG. 19 is a schematic block diagram illustrating an electronic device including a display device in accordance with an embodiment.
Figure 20:
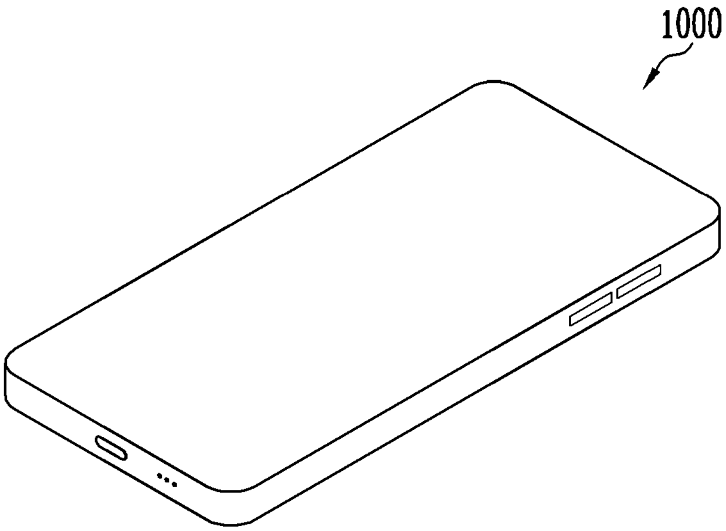
FIG. 20 is a schematic diagram illustrating an example where the electronic device of FIG. 19 is a smartphone.
Figure 21:
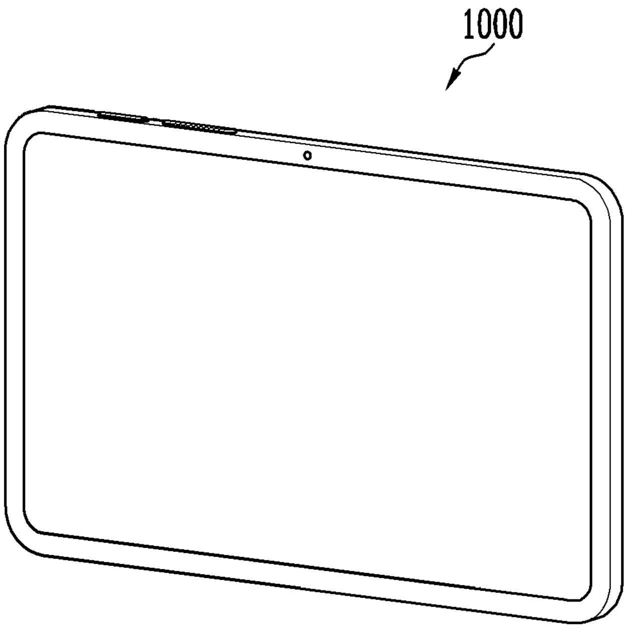
FIG. 21 is a schematic diagram illustrating an example where the electronic device of FIG. 19 is a tablet computer.

FIG. 19 is a schematic block diagram illustrating an electronic device 1000 including a display device in accordance with an embodiment. FIG. 20 is a schematic diagram illustrating an example where the electronic device 1000 of FIG. 19 is a smartphone. FIG. 21 is a schematic diagram illustrating an example where the electronic device 1000 of FIG. 19 is a tablet computer.

Referring to FIGS. 19 to 21, the electronic device 1000 may include a processor 1010, a memory device 1020, a storage device 1030, an input/output (I/O) device 1040, a power supply 1050, and a display device 1060. The display device 1060 may be the display device 10 of FIG. 1. The electronic device 1000 may further include various ports for communication with a video card, a sound card, a memory card, a USB device, or other systems. In an embodiment, as illustrated in FIG. 20, the electronic device 1000 may be a smartphone. In an embodiment, as illustrated in FIG. 21, the electronic device 1000 may be a tablet computer. However, the aforementioned examples are illustrative, and the electronic device 1000 is not necessarily limited to the aforementioned examples. For example, the electronic device 1000 may be a cellular phone, a video phone, a smart pad, a smartwatch, a navigation device for vehicles, a computer monitor, a laptop computer, a head-mounted display device, or the like.

The processor 1010 may perform specific calculations or tasks. In an embodiment, the processor 1010 may be a microprocessor, a central processing unit, an application processor, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to control signals or data from the processor 1010. The display device 1060 may be connected to other components through the buses or other communication links.

The drawings referred to so far and the detailed description of the disclosure described herein are merely examples of the disclosure, are used for merely describing the disclosure, and are not intended to limit the meaning and the scope of the disclosure described in claims. Therefore, those skilled in the art will understand that various modifications and equivalent other embodiments are possible from these. Thus, the true scope of the disclosure should be determined by the technical spirit of the appended claims.

What is claimed is:

1. A pixel comprising:

a light emitting element emitting light with a luminance based on a driving current;

an emission transistor passing the driving current when the emission transistor receives an emission signal of a turn-on level and blocking the driving current when the emission transistor receives the emission signal of a turn-off level; and an initialization transistor supplying an initialization voltage to an anode electrode of the light emitting element when the initialization transistor receives an initialization signal of a turn-on level and stopping the supplying of the initialization voltage when the initialization transistor receives the initialization signal of a turn-off level, wherein the emission signal sequentially includes a first pulse and a second pulse of a turn-on level, the initialization signal sequentially includes a third pulse and a fourth pulse of a turn-on level, the third pulse is generated in a period between the first pulse and the second pulse, the fourth pulse is generated after the second pulse, and when an end time point of the first pulse changes to a changed end time point, a start time point of the third pulse changes to a changed start time point.

2. The pixel according to claim 1, wherein when the end time point of the first pulse changes to the changed end time point, a width of the first pulse changes to a changed width.

3. The pixel according to claim 2, wherein when the end time point of the first pulse changes to the changed end time point, a start time point of the first pulse does not change.

4. The pixel according to claim 2, wherein when the end time point of the first pulse becomes earlier and changes to the changed end time point, the start time point of the third pulse becomes earlier and changes to the changed start time point.

5. The pixel according to claim 4, wherein regardless of the changed width of the first pulse, a time interval between the changed end time point of the first pulse and the changed start time point of the third pulse is maintained.

6. The pixel according to claim 4, wherein as the changed width of the first pulse decreases, a time interval between the changed end time point of the first pulse and the changed start time point of the third pulse decreases.

7. The pixel according to claim 4, wherein as the changed width of the first pulse decreases, a time interval between the changed end time point of the first pulse and the changed start time point of the third pulse increases.

8. The pixel according to claim 2, wherein when the width of the first pulse changes, a width of the second pulse is maintained.

9. The pixel according to claim 2, wherein when the width of the first pulse changes, a width of the third pulse and a width of the fourth pulse are maintained.

10. The pixel according to claim 1, wherein while the first pulse is maintained, the initialization signal maintains the turn-off level.

11. A method of driving a pixel, wherein the pixel comprises:

a light emitting element emitting light with a luminance based on a driving current;

an emission transistor passing the driving current when the emission transistor receives an emission signal of a turn-on level and blocking the driving current when the emission transistor receives the emission signal of a turn-off level; and an initialization transistor supplying an initialization voltage to an anode electrode of the light emitting element when the initialization transistor receives an initialization signal of a turn-on level and stopping the supplying of the initialization voltage when the initialization transistor receives the initialization signal of a turn-off level, the method comprises:

supplying the emission signal sequentially including a first pulse and a second pulse of a turn-on level; and supplying the initialization signal sequentially including a third pulse and a fourth pulse of a turn-on level, the third pulse is generated in a period between the first pulse and the second pulse, the fourth pulse is generated after the second pulse, and when an end time point of the first pulse changes to a changed end time point, a start time point of the third pulse changes to a changed start time point.

12. The method according to claim 11, wherein when the end time point of the first pulse changes to the changed end time point, a width of the first pulse changes to a changed width.

13. The method according to claim 12, wherein when the end time point of the first pulse changes to the changed end time point, a start time point of the first pulse does not change.

14. The method according to claim 12, wherein when the end time point of the first pulse becomes earlier and changes to the changed end time point, the start time point of the third pulse becomes earlier and changes to the changed start time point.

15. The method according to claim 14, wherein regardless of the changed width of the first pulse, a time interval between the changed end time point of the first pulse and the changed start time point of the third pulse is maintained.

16. The method according to claim 14, wherein as the changed width of the first pulse decreases, a time interval between the changed end time point of the first pulse and the changed start time point of the third pulse decreases.

17. The method according to claim 14, wherein as the changed width of the first pulse decreases, a time interval between the changed end time point of the first pulse and the changed start time point of the third pulse increases.

18. The method according to claim 12, wherein when the width of the first pulse changes, a width of the second pulse is maintained.

19. The method according to claim 12, wherein when the width of the first pulse changes, a width of the third pulse and a width of the fourth pulse are maintained.

20. The method according to claim 11, wherein while the first pulse is maintained, the initialization signal maintains the turn-off level.

21. An electronic device comprising:

a processor to provide input image data; and a display device to display an image based on the input image data by using pixels, wherein each of the pixels comprises:

a light emitting element emitting light with a luminance based on a driving current;

an emission transistor passing the driving current when the emission transistor receives an emission signal of a turn-on level and blocking the driving current when the emission transistor receives the emission signal of a turn-off level; and an initialization transistor supplying an initialization voltage to an anode electrode of the light emitting element when the initialization transistor receives an initialization signal of a turn-on level and stopping the supplying of the initialization voltage when the initialization transistor receives the initialization signal of a turn-off level, wherein the emission signal sequentially includes a first pulse and a second pulse of a turn-on level, the initialization signal sequentially includes a third pulse and a fourth pulse of a turn-on level, the third pulse is generated in a period between the first pulse and the second pulse, the fourth pulse is generated after the second pulse, and when an end time point of the first pulse changes to a changed end time point, a start time point of the third pulse changes to a changed start time point.

* * * * *